United States Patent
Yamaguchi (10) Patent No.: US 10,486,926 B1
(45) Date of Patent: Nov. 26, 2019

(54) APPARATUS FOR TRANSPORTING PAPER SHEET

(71) Applicant: TOSHIBA TEC KABUSHIKI KAISHA, Shinagawa-ku, Tokyo (JP)

(72) Inventor: Masao Yamaguchi, Katsushika Tokyo (JP)

(73) Assignee: TOSHIBA TEC KABUSHIKI, Tokyo (JP)

( * ) Notice: Subject to any disclaimer, the term of this patent is extended or adjusted under 35 U.S.C. 154(b) by 0 days.

(21) Appl. No.: 15/978,458

(22) Filed: May 14, 2018

(51) Int. Cl.
- *B65H 5/06* (2006.01)
- *B65H 5/36* (2006.01)
- *H04N 1/12* (2006.01)
- *G10K 11/178* (2006.01)
- *H04N 1/00* (2006.01)

(52) U.S. Cl.
CPC ............... *B65H 5/36* (2013.01); *B65H 5/062* (2013.01); *G10K 11/17825* (2018.01); *H04N 1/00572* (2013.01); *H04N 1/123* (2013.01); *B65H 2601/521* (2013.01); *G10K 2210/1052* (2013.01)

(58) Field of Classification Search
CPC .... B65H 5/062; B65H 5/36; B65H 2601/521; B65H 2515/82; G10K 11/17825; G10K 2210/1052; H04N 1/123; H04N 1/00572
See application file for complete search history.

(56) References Cited

U.S. PATENT DOCUMENTS

| | | | | |
|---|---|---|---|---|
| 5,289,147 A | * | 2/1994 | Koike | B41J 29/10 399/1 |
| 2009/0010446 A1 | * | 1/2009 | Nakane | G10K 11/178 381/71.5 |
| 2013/0163773 A1 | * | 6/2013 | Liu | G10K 11/178 381/71.3 |
| 2015/0028533 A1 | * | 1/2015 | Kato | B65H 7/14 271/3.16 |
| 2016/0318724 A1 | | 11/2016 | Yamaguchi | |

* cited by examiner

*Primary Examiner* — David H Bollinger
(74) *Attorney, Agent, or Firm* — Foley & Lardner LLP (57) ABSTRACT

A paper sheet transporting apparatus includes a transporting guide through which a paper sheet is transported and a sound propagation guide to transmit sound that is provided separately from the transporting guide by connecting two positions separated from each other on the transporting guide. When a difference between a length between the two positions of the transporting guide and a length of the sound propagation guide connecting the two positions is defined as $\Delta L(m)$, $m=(2n-1)$ (n is an integer) is satisfied, and a wavelength of a sound deadening symmetrical sound is defined as $\lambda(m)$, $\Delta L = m \cdot \lambda/2$ is satisfied.

15 Claims, 8 Drawing Sheets

APPARATUS FOR TRANSPORTING PAPER SHEET

FIELD

Embodiments described herein relate generally to an image forming apparatus such as a copying machine or a printer, and a paper sheet transporting apparatus such as an automatic original document feeding device.

BACKGROUND

For example, the automatic original document feeding device of the copying machine (a copier) generates various types of noises such as a driving sound of a motor for transporting an original document, a sound made when gears transmitting driving are meshed with each other, or a sound made when the original document rubs against or collides with a transporting guide.

In order to reduce such noise, a technique of eliminating sound having a specific frequency by using a Helmholtz resonator is known. However, due to sound deadening, when using the Helmholtz resonator, it makes the apparatus expensive, and a space for installing the Helmholtz resonator is also required.

In addition, in the related art, for noise countermeasures in the image forming apparatus, a sound absorbing material is commonly used. However, when a sound absorbing material is used, there is a disadvantage that a sound deadening effect is small with respect to a sound having a specific frequency. In addition, when the sound absorbing material is used, the apparatus becomes expensive accordingly.

Therefore, development of a paper sheet transporting apparatus and an image forming apparatus capable of reducing noise with an inexpensive apparatus configuration is desired.

DETAILED DESCRIPTION

In general, according to at least one embodiment, a paper sheet transporting apparatus includes a transporting guide (path) through which a paper sheet is transported and a sound propagation guide (path) for transmitting sound that is provided separately from the transporting guide (path) by connecting two positions separated from each other on the transporting guide (path). When a difference between a length between the two positions of the transporting guide (path) and the length of the sound propagation guide (path) connecting the two positions is defined as $\Delta L(m)$, $m=(2n-1)$ (n is an integer) is satisfied, and a wavelength of a sound deadening symmetrical sound is defined as $\lambda(m)$, $\Delta L = m \cdot \lambda/2$ is satisfied.

In general, according to one or more other embodiments, an image forming apparatus includes an original document transporting path through which an original document is transported, an image reading unit (an image reader) that reads an image of the original document to be transported on the original document transporting path, a first sound propagation path for transmitting sound that is provided separately from the original document transporting path by connecting two positions separately from each other on the original document transporting path, and an image forming unit (an image former) that forms an image read by the image reading unit (the image reader) on a recording medium, in which, when a difference between a length between the two positions of the original document transporting path and the length of the first sound propagation path connecting the two positions is defined as $\Delta L(m)$ $m=(2n-1)$ (n is an integer) is satisfied, and a wavelength of a sound deadening symmetrical sound is defined as $\lambda(m)$, $\Delta L = m \cdot \lambda/2$ is satisfied.

First Embodiment

Hereinafter, at least one first embodiment will be described in detail with reference to the drawings.

Figure 1:
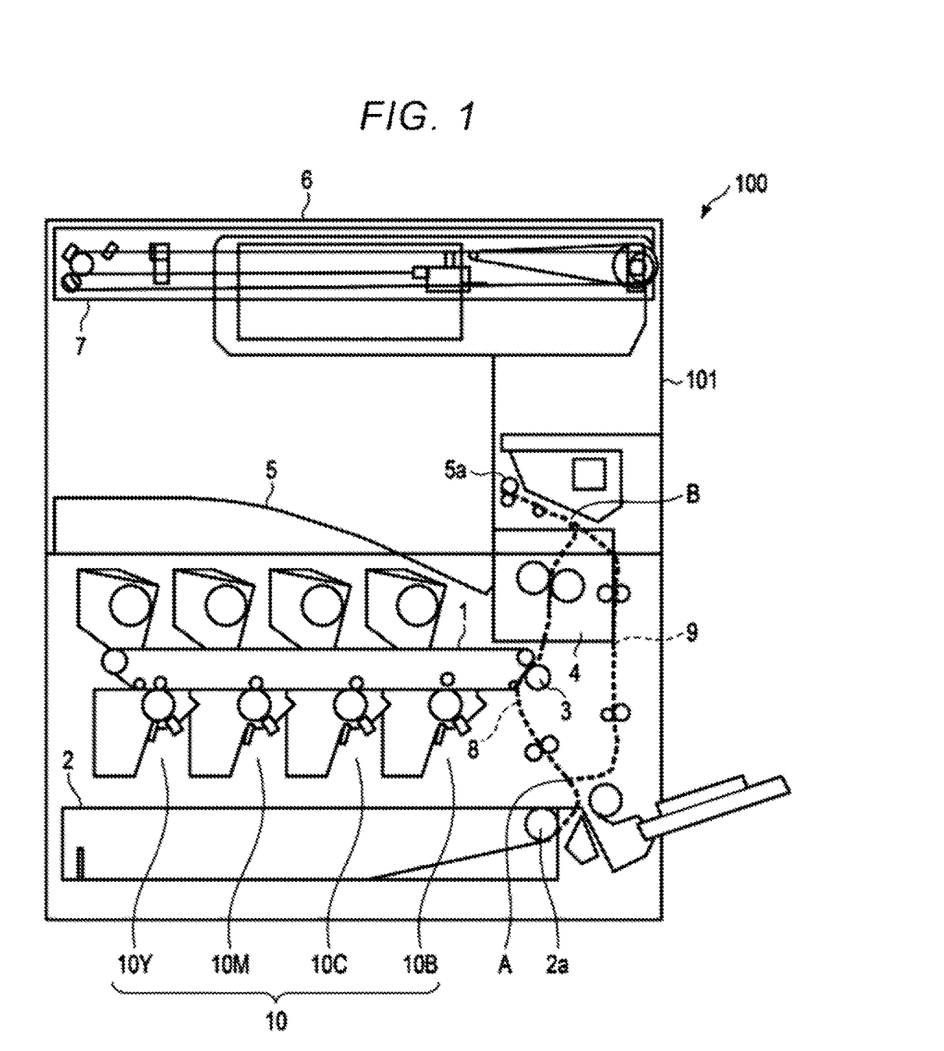
FIG. 1 is a schematic view illustrating a copying machine according to at least one embodiment.

FIG. 1 is a schematic view illustrating a copying machine 100 according to at least one embodiment of an image forming apparatus. The copying machine 100 includes an image forming unit (an image former) 10 in a housing 101. The image forming unit 10 includes a yellow image forming unit 10Y, a magenta image forming unit 10M, a cyan image forming unit 10C, and a black image forming unit 10B. The four-color image forming units 10Y, 10M, 10C, and 10B are separated from each other in a horizontal direction.

In addition to this, the copying machine 100 includes an endless transfer belt 1 for overlapping and transferring images of respective colors formed by the four-color image forming units 10Y, 10M, 10C, and 10B, a paper feed cassette (i.e., a feeder or holder which serves as an accommodating unit) accommodating paper P (paper sheet and recording medium), a transfer roller 3 for transferring the image on the transfer belt 1 to the paper P, a fixing device 4 for fixing the image on the paper P, a paper discharge roller 5a that discharges the paper P passing through the fixing device 4 to a paper discharge tray 5, an original document platen 6 on which an original document D (paper sheet) is placed, and a scanner 7 that reads the image of the original document D on the original document platen 6.

The scanner 7 reads an image of the original document D fed to the original document platen 6 by an automatic original document feeding device 110 (FIG. 2) described later. The image forming units 10Y, 10M, 10C, and 10B for the respective colors form electrostatic latent images on an image carrier based on the respective color components of the image read by the scanner 7. The image forming units 10Y, 10M, 10C, and 10B for the respective colors develop the electrostatic latent images with the respective color toners and transfer the electrostatic latent images onto the transfer belt 1 in an overlapping manner.

The paper P is picked up from the paper feeding cassette 2 by a pickup roller 2a. The paper P picked up is transported to the fixing position through a main transporting path 8 (medium transporting path or medium transporting guide). The transfer roller 3 transfers the developer images of the respective colors on the transfer belt 1 onto the paper P passing through the fixing position. The paper P to which the developer images are transferred passes through the fixing device 4 through the main transporting path 8. The developer image transferred onto the paper P is melted in the fixing device 4 and fixed on the paper P. The paper P on which the image is formed in this manner is discharged to the paper discharge tray 5 by the paper discharge roller 5a.

When images are formed on both sides of the paper P, the paper discharge roller 5a in a state where the paper P on which an image is formed on one side is clamped and constrained is reversely rotated so that the paper P is transported to a reverse transporting path 9 (second sound propagation path or guide and medium reverse transporting path or guide). The paper P transported through the reverse transporting path 9 is transported again to the main transporting path 8, and an image is formed on the rear surface thereof.

Figure 2:
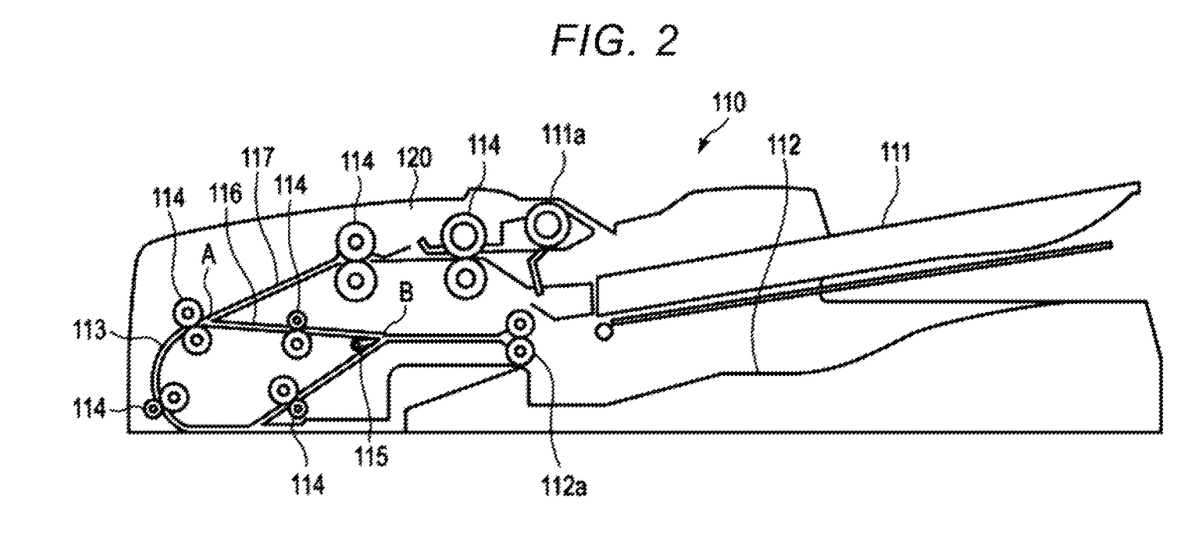
FIG. 2 is a schematic view illustrating an automatic original document feeding device according to at least one embodiment.

FIG. 2 is a schematic view illustrating the automatic original document feeding device 110 (hereinafter referred to as an ADF 110) which may be an embodiment of the paper sheet transporting apparatus. The ADF 110 includes a paper feed tray 111 for feeding the original document D, a paper discharge tray 112 for discharging the original document D, and an original document transporting path 113 that transports the fed original document D through the paper feed tray 111 toward the paper discharge tray 112 through the reading position. Further, the ADF 110 includes an original document reverse transporting path 116 (first sound propagation path) for reversing the original document D.

Figure 3:
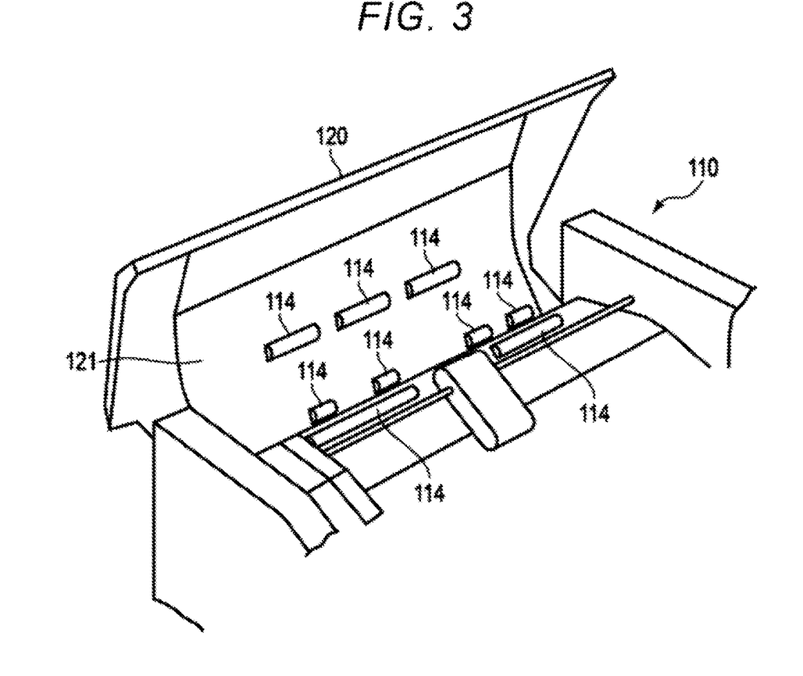
FIG. 3 is a schematic view illustrating a state where a cover of the automatic original document feeding device in FIG. 2 is opened.

FIG. 3 illustrates a state where a cover 120 for opening a part of the original document transporting path 113 is opened. As in an inner surface 121 of the cover 120 in FIG. 3, the original document transporting path 113 is a substantially sealed narrow gap defined on both sides by a wall curved along a path through which the original document D passes. The original document reverse transporting path 116 is also a narrow gap substantially sealed on both sides thereof.

Further, the ADF 110 includes a paper feed roller 111a for feeding the original document D inserted into the paper feed tray ill to the original document transporting path 113, and a paper discharge roller 112a for discharging the original document D transported through the original document transporting path 113 to the paper discharge tray 112. The ADF 110 includes a plurality of transporting rollers 114 along the original document transporting path 113 and the original document reverse transporting path 116. The cover 120 holds a plurality of transporting rollers 114 in a state where a part of the outer peripheral surface of the transporting roller 114 is exposed from the inner surface 121 toward the original document transporting path 113 side.

The original document D is picked up from the paper feed tray 111 by the paper feed roller 111a and transported through the original document transporting path 113. The image of the original document D passed through the original document transporting path 113 through the reading position is read by the scanner 7 and discharged to the paper discharge tray 112 via the paper discharge roller 112a.

When the images on both sides of the original document D is read, the paper discharge rollers 112a in the state of clamping and constraining the original document D fed to the original document platen 6 are reversely rotated, a gate 115 is switched, and the original document D is transported to the original document reverse transporting path 116. The original document D transported through the original document reverse transporting path 116 is transported again to the original document transporting path 113, and the image on the rear surface thereof is read by the scanner 7.

Since the copying machine 100 equipped with the ADF 110 described above transports the paper P in the housing 101 and transports the original document Din the ADF 110, an operation sound accompanying the transporting operation is generated. Examples of operation sounds include a driving sound of a motor, a meshing sound of a gear, a driving sound of a fan, a sound that the paper P or the original document D contacts a transporting guide (not illustrated), a sound of the paper P or the original document D being warped, and the like as the operation sound. In general, since the copying machine 100 is installed in an office, it is desirable that such operation sound is made as small as possible.

Figure 4:
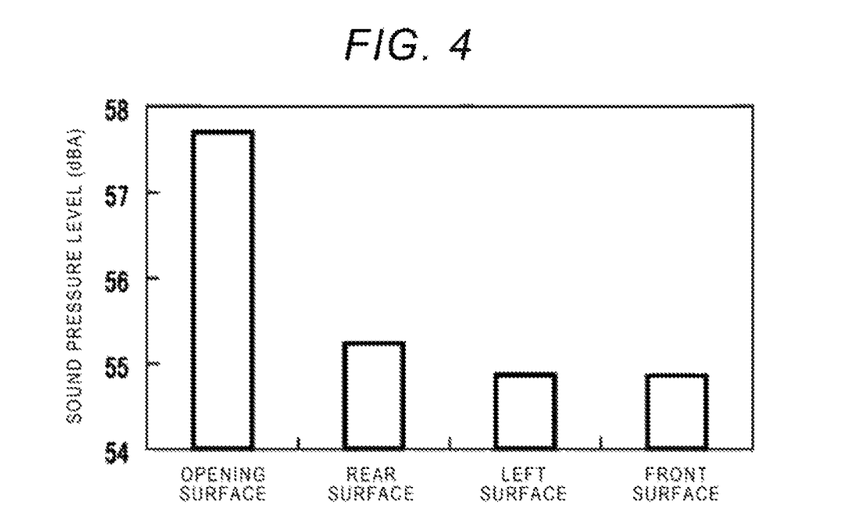
FIG. 4 is a graph illustrating a sound pressure level of an operation sound of the automatic original document feeding device in FIG. 2.

In order to investigate such operation sounds, the inventors of the present application set up microphones at several places about 1 m away from the copying machine 100, and measure a sound pressure level of the sound generated from the ADF 110 when reading one original document D. The results are illustrated in FIG. 4. The operation sound of the ADF 110 goes out through all the gaps. For example, the operation sound generated in the ADF 110 is transmitted through the original document transporting path 113 and exits via an opening portion communicating with the outside. The ADF 110 of at least one embodiment includes an opening portion for feeding the original document D on the right side (right side in FIG. 2) as viewed from the front and an opening portion for discharging the original document D. Therefore, the operation sound generated in the ADF 110 mainly comes out from the certain surface (the opening surface on the right side in FIG. 2) of the opening portion for feeding and discharging the original document D. FIG. 4 also illustrates that the sound pressure of the operation sound measured on the opening surface side is the largest as compared with the front, rear, and left surfaces of the ADF 110.

Figure 5:
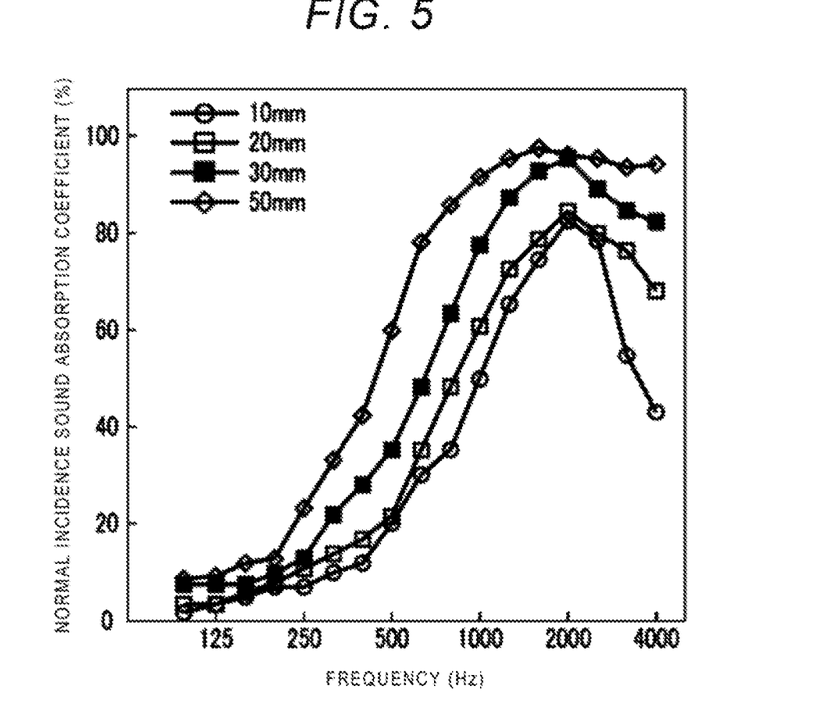
FIG. 5 is a graph illustrating sound absorbing characteristics of urethane foam.

In order to reduce such operation noise, in addition to the method using the Helmholtz resonator described in the related, in general, a method using a so-called sound absorbing material and the like are known. As a typical sound absorbing material, urethane foam is known. FIG. 5 is a graph illustrating the sound absorbing characteristics of urethane foam and illustrating the relationship between the frequency of the sound to be absorbed and a normal incidence sound absorption coefficient when a thickness of the urethane foam is used as a parameter. In this manner, it is understood that a peak of the sound absorption coefficient exists in a certain frequency range (hereinafter, referred to as a frequency band) centered on the frequency of about 2000 Hz regardless of the thickness of the urethane foam. That is, when attempting to reduce the operation sound by using urethane foam, it is possible to effectively absorb the sound in the frequency band of about 2000 Hz, while sounds of other frequencies cannot absorb much sound.

Figure 6:
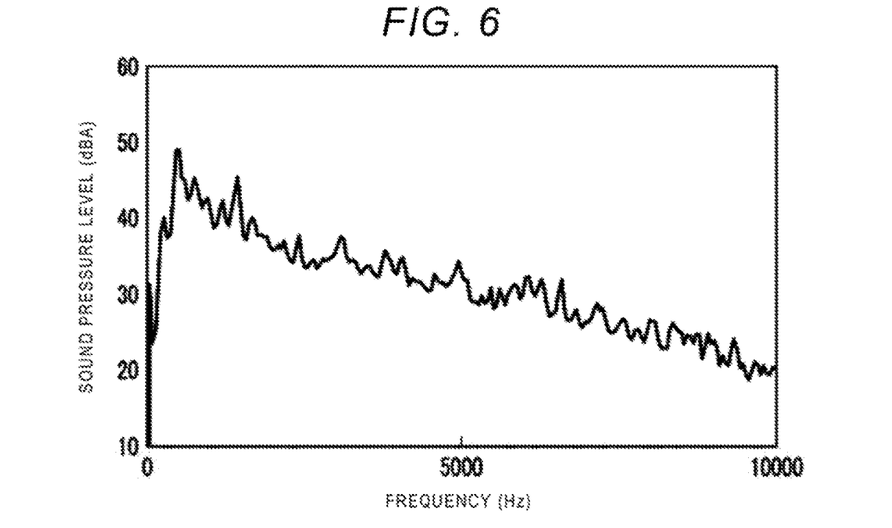
FIG. 6 is a graph obtained by frequency analysis of the operation sound of the automatic original document feeding device in FIG. 2.

FIG. 6 is a graph illustrating the result of frequency analysis of the operation sound emitted from the opening surface side of the ADF 110 described with reference to FIG. 4. In this manner, it can be understood that the sound having a specific frequency has a peak of the sound pressure level. The sounds having frequencies having these peaks are sounds related to the driving of the motor, such as the driving sound of the motor, the meshing sound of the gear, the sound of the vibration of the motor propagating to other members and vibrating. Among them, in order to investigate particularly harsh sounds, the inventors of the present application asked five subjects to listen to the operation sound of the ADF 110 and conducted a questionnaire survey. As a result, all five responded that the sound related to 516 Hz motor drive was the harshest. The sound having the frequency 516 Hz is a sound of a frequency which cannot be effectively absorbed by the urethane foam described above.

Figure 7:
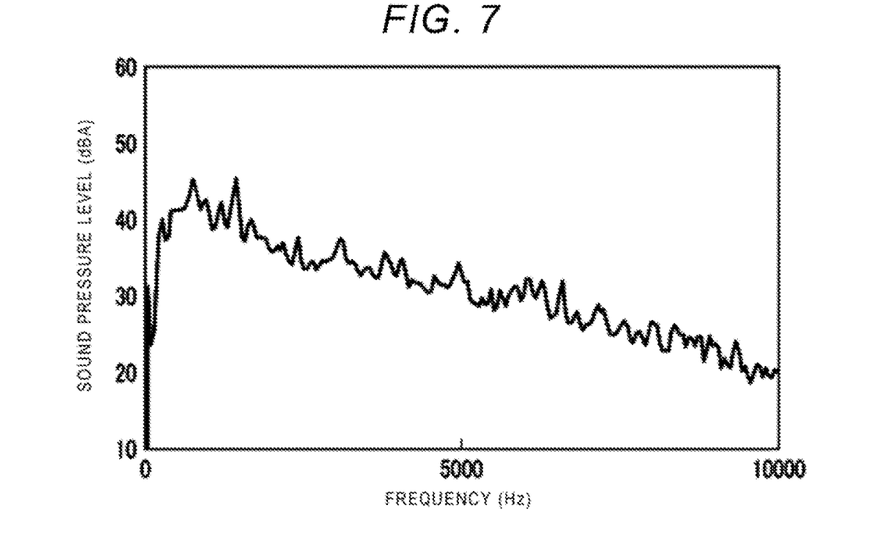
FIG. 7 is a graph obtained by reducing the sound having a specific frequency of the operation sound in FIG. 6 by simulation.

FIG. 7 is a graph of the operation sound that cuts off a peak sound in a certain frequency band centered on 516 Hz, in which all subjects identified the sound as being harsh. The inventors of the present application generated the operation sound of FIG. 7 by processing the operation sound described with reference to FIG. 6 in a simulation manner, and subjective evaluation to the five subjects to listen the sound for their subjective impressions. At this time, the inventors conducted the questionnaire survey as to whether the operation sound was improved (such that the subjects cared less about the sound) compared with the operation sound before cutting the peak sound in the frequency band in the vicinity of 516 Hz (FIG. 6). As a result, all subjects answered that the operation sound was improved.

That is, in the ADF 110 of at least one embodiment, it is found that the operation sound can be improved by deadening a sound having a frequency band in the vicinity of 516 Hz among the operation sounds heard from the ADF 110. Such a method of improving the operation sound is also effective for other apparatuses. For example, even in the copying machine 100, it is possible to improve the operation sound by deadening the sound having a specific frequency band.

Therefore, in order to effectively reduce the sound (for example, sound having a frequency in the vicinity of 516 Hz in the ADF 110 of at least one embodiment) having a specific frequency band, the inventors of the present application provide a sound propagation path having a predetermined length for the purpose of transmitting operation sounds, separated from the original document transporting path 113 through which the operation sound is transmitted. The sound propagation path referred to here may be a generally sealed and narrow space connecting two positions separated along the original document transporting path 113. In at least one embodiment, as illustrated in FIG. 2, the function of serving as a sound propagation path is given to the original document reverse transporting path 116 connecting the point A and the point B in the middle of the original document transporting path 113. Specifically, in accordance with the frequency of the sound to be deadened (516 Hz in at least one embodiment), the length of the original document transporting path 113 between the point A and the point B and the length of the original document reverse transporting path 116 between the point A and the point B are determined.

As described above, most of the operation sound generated in the ADF 110 goes out from the opening surface side of the ADF 110 through the original document transporting path 113. At this time, a part of sound propagating through the original document transporting path 113 passes through the original document reverse transporting path 116. For example, the operation sound generated near the paper feed roller 111a passes through the original document transporting paths 117 and 113 and passes through point A and point. B. At this time, a part of the operation sound passing through the point A is branched to the original document reverse transporting path 116. The operation sound passing through the original document transporting path 113 and the operation sound passing through the original document reverse transporting path 116 join at the point B. Conversely, the operation sound generated in the vicinity of the paper discharge roller 112a passes through the original document transporting path 113 and passes through the point B and the point A. At this time, a part of the operation sound passing through the point B is branched to the original document reverse transporting path 116. Then, the operation sound passing through the original document transporting path 113 and the operation sound passing through the original document reverse transporting path 116 join at the point A.

Figure 8:
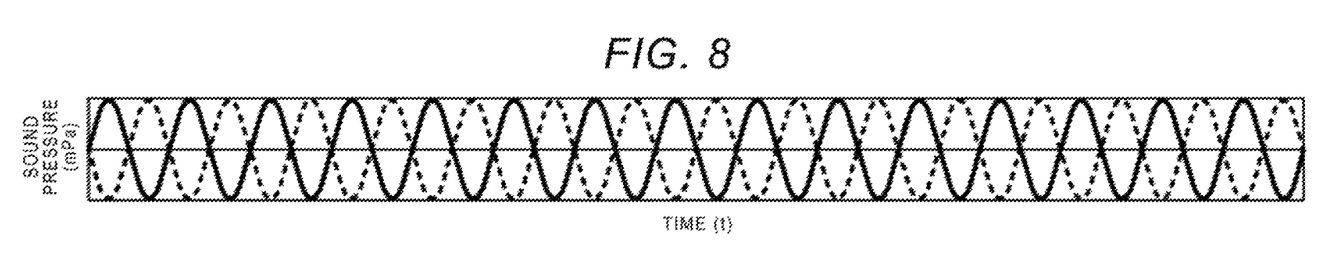
FIG. 8 is a graph illustrating a sound deadening state where the operation sound having the specific frequency passing through an original document transporting path in FIG. 2 and the operation sound having the specific frequency passing through an original document reverse transporting path are shifted by a half wavelength and overlapped.

That is, when two sounds joined at the point B or the point A overlap, the sounds having the specific frequency can be eliminated by overlapping two sounds of a specific frequency with each other at a phase at which two sounds having the specific frequency eliminate each other. FIG. 8 illustrates a state where two sounds having the specific frequency are shifted by a half wavelength so as to deadening a sound having the specific frequency at a confluence point (A or B) of two sounds. When the sounds having the same frequency are shifted by a half wavelength and piled up, the vibration of air interferes to eliminate the vibration and the sound pressure becomes zero. In theory, the sounds having the same sound pressure (amplitude) of the same wavelength are sounded, and the sound pressure of the superimposed sound becomes zero. That is, by making the difference between the length of the original document transporting path 113 between the point A and the point B and the length of the original document reverse transporting path 116 between the point A and the point B (hereinafter, referred to as a target sound) an odd multiple of the half wavelength of the sound to be deadened, it is possible to eliminate the target sound.

Hereinafter, a method of eliminating the target sound will be described using generalized mathematical formulas. For example, when the difference between the length of the original document transporting path 113 between the point A and the point B and the length of the original document reverse transporting path 116 between the point A and the point B is defined as $\Delta L(m)$, the wavelength of the target sound is defined as $\lambda(m)$, and when $m=(2n-1)$ (n is an integer) is satisfied, by setting the length of the original document transporting path 113 between the point A and the point B and the length of the original document reverse transporting path 116 between the point. A and the point. B so as to satisfy Expression (1) below, the target sound can be eliminated.

$$\Delta L = m \cdot \lambda / 2 \qquad (1)$$

In this case, the length of the original document transporting path 113 between the point A and the point B, and the length of the original document reverse transporting path 116 between the point A and the point B may be longer. In at least one embodiment, the length of each transporting path is set such that the length of the original document reverse transporting path 116 between the point A and the point B is shorter than the length of the original document transporting path 113 between the point A and the point B by an odd multiple of the half wavelength of the target sound.

As described above, according to at least one embodiment, by setting the length between AB of the original document transporting path 113 and the original document reverse transporting path 116 according to the wavelength of the target sound to be deadened, it is possible to reduce the noise of the ADF 110 only by setting the length of the transporting path of the existing apparatus to a predetermined length without requiring an expensive apparatus configuration for sound deadening.

In at least one embodiment, the original document reverse transporting path 116 connecting the point A and the point B on the original document transporting path 113 is used as a sound propagation path. However, considering mainly the sound transmitted through the original document reverse transporting path 116, the original document transporting path 113 connecting the point A and the point B on the original document reverse transporting path 116 functions as a sound propagation path for eliminating the target sound.

In addition, the sound propagation path may be a gap formed by a substantially sealed space, and the shape, arrangement position, and the like thereof can be selected in an arbitrary manner. For example, the sound propagation path may be a relatively long sealed space bent in a meander shape or the like.

Example

Figure 9:
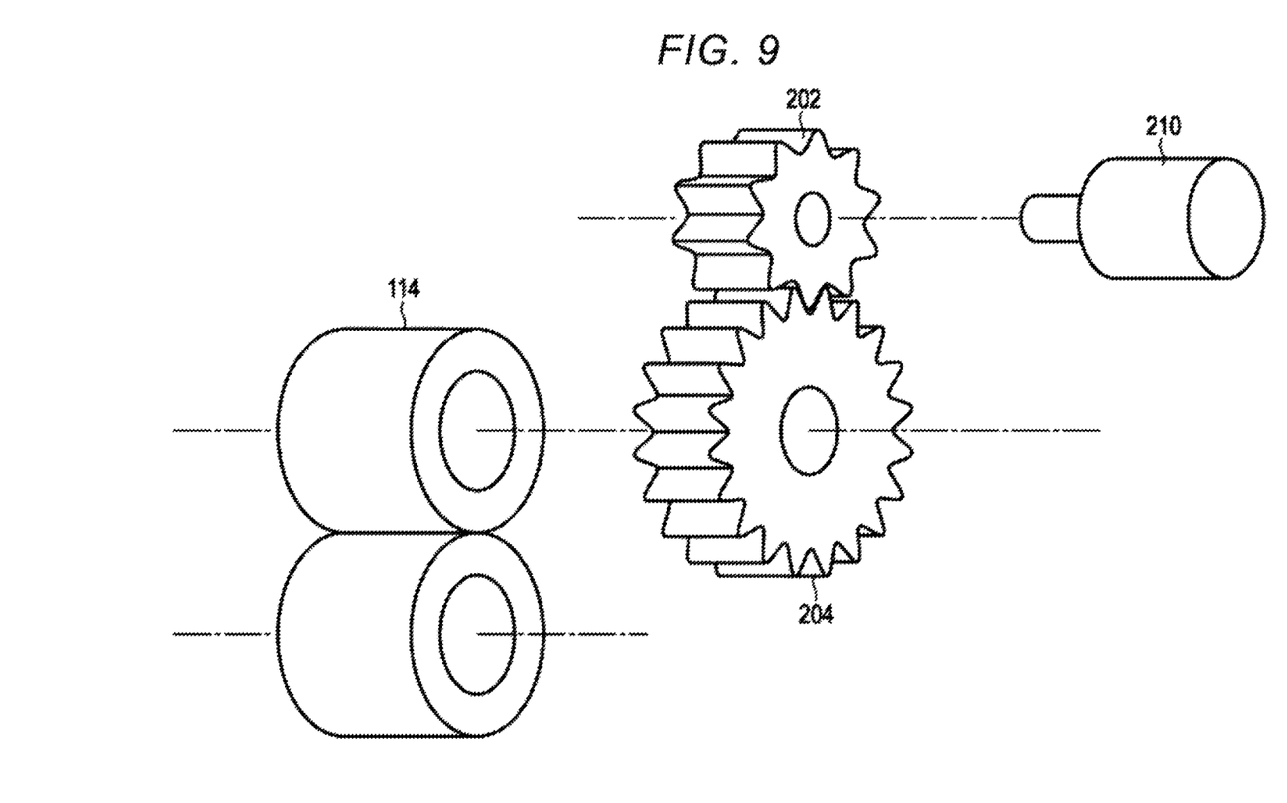
FIG. 9 is a schematic view illustrating an apparatus configuration for driving a transporting roller of the automatic original document feeding device in FIG. 2.

FIG. 9 is a schematic view illustrating a motor 210 that drives a transporting roller 114 provided on the original document transporting path 113 of the ADF 110 and two gears 202 and 204 that transmits driving force of the motor 210 to the transporting roller 114. The operation sound generated in the apparatus configuration of FIG. 9 is the driving sound of the motor 210, the sound of the two gears 202 and 204 meshing with the other. Hereinafter, a method of eliminating this meshing sound will be described, with the meshing sound of the two gears 202 and 204 as the target sound.

When a speed at which sound propagates through the air is defined as c (m/s) and the frequency of the target sound is defined as f (Hz), the wavelength kW of the target sound is given by Expression (2) below.

$$\lambda = c/f \tag{2}$$

In addition, when a propagation speed of the sound in the art at 0(° C.) is defined as $c_0$ (m/s) and a temperature of the air is defined as T (° C.), a speed c (m/s) of the sound propagating through the air is expressed by Expression (3) below.

$$c = c_0(1 + T/273)^{1/2} \tag{3}$$

On the other hand, when the number of teeth of one gear 202 is defined as z and the number of revolutions of the gear 202 is defined as N (rpm), the frequency f (Hz) of the target sound in at least one embodiment is expressed by Expression (4) below.

$$f = N \cdot z / 60 \tag{4}$$

Thus, Expression (1) describes above can be rewritten as follows.

$$\Delta L/m = 30 \cdot c/(N \cdot z) \tag{5}$$

Since the propagation speed of the sound in the air at 0(° C.) is $c_0 \leq 331.5$ (m/s) and the temperature inside a machine body of the ADF 110 varies within the range of 23(° C.) to 35(° C.), Expression (6) below is derived from Expression (3).

$$10355/(N \cdot z) < \Delta L/m < 10563/(N \cdot z) \tag{6}$$

That is, by setting the difference ΔL between the length of the original document transporting path 113 connecting the point A and the point B and the length of the original document reverse transporting path 116 connecting the point A and the point B so as to satisfy Expression (6) above, the target sound can be eliminated.

Alternatively, by changing at least one of the number of revolutions N and the number of teeth z of the gear 202 so as not to change the length of the original document transporting path 113 and the length of the original document reverse transporting path 116 but satisfying Expression (6) above, the target sound can be eliminated.

Second Embodiment

Figure 10:
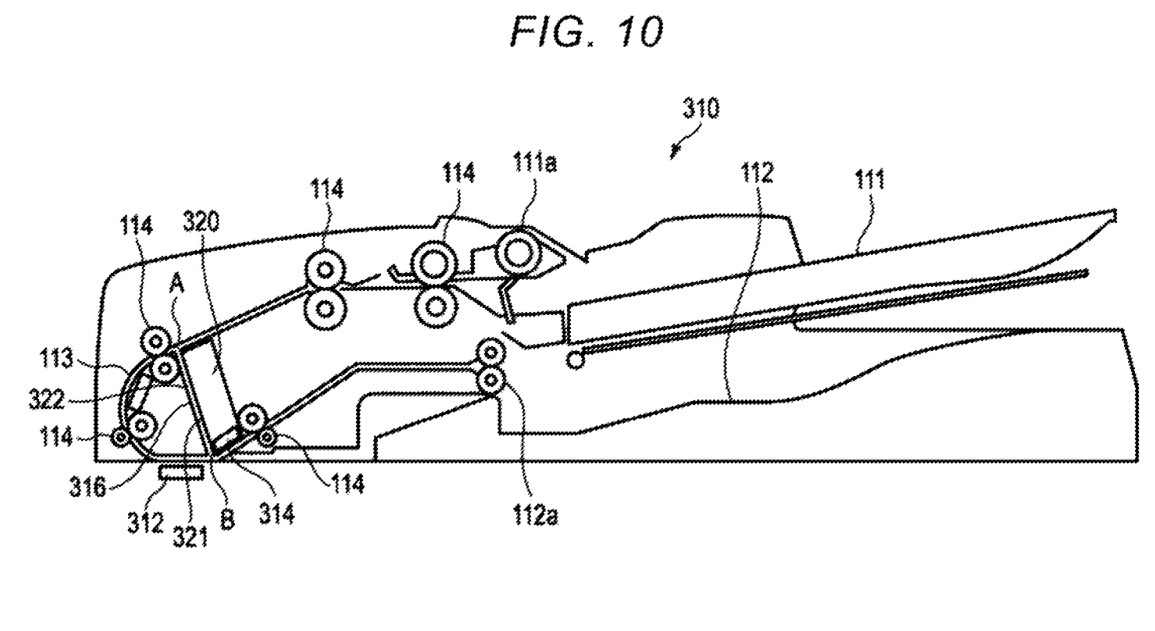
FIG. 10 is a schematic view illustrating an automatic original document feeding device according to at least one embodiment.

FIG. 10 is a schematic view illustrating the ADF 310 according to at least one second embodiment. The ADF 310 does not include the original document reverse transporting path 116, but includes two charge-coupled devices (CCDs), which are sensors 312 and 314 for reading images on both sides of the original document ID on both sides of the original document transporting path 113, respectively. That is, when the images on both sides of the original document D are read by the ADF 310, the images on both sides of the original document D are respectively read by the two CCD sensors 312 and 314 on both sides of the original document transporting path 113.

In addition, the ADF 310 includes a sound propagation path 316 connecting the point A and the point B in the middle of the original document transporting path 113, instead of the original document reverse transporting path 116. The sound propagation path 316 is a substantially sealed gap that does not transport the original document D. The ADF 310 of at least one embodiment has substantially the same structure as the ADF 110 of the above-described at least one first embodiment except for the CCD sensors 312 and 314 and the sound propagation path 316. Therefore, the same reference numerals are given to the components functioning similarly to those of the ADF 110 of the at least one first embodiment, and a detailed description thereof will be omitted.

The sound propagation path 316 may be a substantially sealed space having an air layer transmitting sound, and may be, for example, a structure in which two plates are slightly spaced separated from each other and are opposed to each other. In at least one embodiment, a sound propagation path 316 is provided by separately facing another plate-like member 322 in parallel and spaced from one side surface 321 of a housing 320 holding one CCD sensor 314. The operation sound of the ADF 310 is transmitted through the gap between one side surface 321 of the housing 320 and the plate-like member 322. In addition, in at least one embodiment, the length of the original document transporting path 113 between the point A and the point B and the length of the sound propagation path 316 between the point A and the point B are set such that the difference ΔL between the length of the original document transporting path 113 between the point A and the point B and the length of the sound propagation path 316 between the point A and the point B satisfies Expression (1) above.

Therefore, also in at least one embodiment, due to the inexpensive apparatus configuration, it is possible to overlap two target sounds shifted by half wavelength at the confluence point A or B of the operation sound, and to eliminate the target sound. Therefore, also in at least one embodiment, it is possible to eliminate the sound having a particularly harsh frequency among the operation sound of the ADF 310, and it is possible to improve the noise.

Third Embodiment

In the at least one first and at least one second embodiments described above, a method of eliminating the target sound of the operation sound generated in the ADFs 110 and 310 is described. However, even in the copying machine 100, the target sound can be erased without changing the configuration of the apparatus greatly.

The operation sound generated in the copying machine 100 mainly goes out through the main transporting path 8 and the reverse transporting path 9. Therefore, for example, by setting the length of the main transporting path 8 between the point A near the pickup roller 2a where the main transporting path 8 and the reverse transporting path 9 branch and the point B near the paper discharge roller 5a where the main transporting path 8 and the reverse transporting path 9 join, and setting the difference ΔL of the length of the reverse transporting path 9 between the point A and the point B so as to satisfy the above Expression (1), the target sound of the frequency f (Hz) can be eliminated. In this case, the reverse transporting path 9 functions as a sound propagation path when viewed from the main transporting path 8, and the main transporting path 8 functions as a sound propagation path when viewed from the reverse transporting path 9.

As described above, also in at least one embodiment, similar to the above-described first and second embodiments, it is possible to eliminate the target sound having a specific frequency included in the operation sound of the copying machine 100, and it is possible to provide the copying machine 100 with less noise. In at least one embodiment, a sound propagation path connecting two positions separated along the main transporting path 8 may be separately provided, or the sound propagation path connecting two positions separated along the reverse transporting path 9 may be additionally provided.

As described above, in at least one embodiment, a method of eliminating a target sound having a specific frequency included in an operation sound may be implemented. However, in certain embodiments, two or more target sound included in the operation sound may be eliminated by providing a plurality of sound propagation paths. Alternatively, if there is a plurality of target sounds, the apparatus configuration may be designed so that the frequencies of a plurality of target sounds are made to coincide with each other. In this case, it is possible to eliminate a plurality of target sounds by providing one sound propagation path, and it is possible to further enhance the sound deadening effect.

While certain embodiments have been described, these embodiments have been presented by way of example only, and are not intended to limit the scope of invention. Indeed, the novel apparatus and methods described herein may be embodied in a variety of other forms furthermore, various omissions, substitutions, and changes in the form of the apparatus and methods described herein may be made without departing from the spirit of the inventions. The accompanying claims and their equivalents are intended to cover such forms or modifications as would fall within the scope and spirit of the inventions.

What is claimed is:

1. A paper sheet transporting apparatus comprising:
a transporting guide configured to transport a paper sheet; and
a sound propagation guide arranged to transmit sound, which is provided separately from the transporting guide by connecting two positions separated from each other on the transporting guide to each other,
wherein, when a difference between a length between the two positions of the transporting guide and a length of the sound propagation guide connecting the two positions to each other is defined as $\Delta L(m)$, $m=(2n-1)$, where n is an integer, is satisfied, and a wavelength of a sound deadening symmetrical sound is defined as $\lambda(m)$,
$\Delta L = m \cdot \lambda/2$ is satisfied.

2. The apparatus according to claim 1,
wherein the sound propagation guide is a reverse transporting guide to reverse the paper sheet passing through the transporting guide and transport the paper sheet to the transporting guide again.

3. The apparatus according to claim 1,
wherein the length of the sound propagation guide connecting the two positions to each other is shorter than the length between the two positions of the transporting guide.

4. A paper sheet transporting apparatus comprising:
a transporting guide configured to transport a paper sheet; and
a sound propagation guide to transmit sound in a state where the paper sheet is not being transported, the sound propagation guide being provided separately from the transporting guide by connecting two positions separated from each other on the transporting guide, to each other.

5. The apparatus according to claim 4,
wherein a length of the sound propagation guide connecting the two positions to each other is shorter than a length between the two positions of the transporting guide.

6. An image forming apparatus comprising:
an original document transporting guide configured to transport an original document;
an image reader configured to read an image of the original document to be transported on the original document transporting guide;
a first sound propagation guide to transmit sound that is provided separately from the original document transporting guide by connecting two positions separated from each other on the original document transporting guide to each other; and
an image former configured to form an image read by the image reader on a recording medium,
wherein, when a difference between a length between the two positions of the original document transporting guide and the length of the first sound propagation guide connecting the two positions to each other is defined as $\Delta L(m)$, $m=(2n-1)$, where n is an integer, is satisfied, and a wavelength of a sound deadening symmetrical sound is defined as $\lambda(m)$,
$\Delta L = m \cdot \lambda/2$ is satisfied.

7. The apparatus according to claim 6,
wherein the first sound propagation guide is an original document reverse transporting guide to reverse the original document passing through the original document transporting guide and to transport the original document to the original document transporting guide again.

8. The apparatus according to claim 6, wherein the length of the first sound propagation guide connecting the two positions is shorter than the length between the two positions to each other of the original document transporting guide.

9. The apparatus according to claim 6, further comprising:
a holder configured to accommodate the recording medium;
a medium transporting guide configured to transport the recording medium from the holder to the image former; and
a second sound propagation guide to transmit sound that is provided separately from the medium transporting guide by connecting two positions separated from each other on the medium transporting guide to each other,
wherein, when a difference between a length between the two positions of the medium transporting guide and a length of the second sound propagation guide connecting the two positions to each other is defined as $\Delta L(m)$, $m=(2n-1)$, where n is an integer, is satisfied,
$\Delta L = m \cdot \lambda/2$ is satisfied.

10. The apparatus according to claim 9, wherein the second sound propagation guide is a medium reverse transporting guide to reverse the recording medium passing through the medium transporting guide and transport the recording medium to the medium transporting guide again.

11. A method of reducing sound in a paper sheet transporting apparatus, comprising:
arranging a sound propagation guide with respect to a transporting guide to transmit sound, and
disposing the sound propagation guide separately from the transporting guide by connecting two positions separated from each other on the transporting guide to each other,
wherein, when a difference between a length between the two positions of the transporting guide and a length of the sound propagation guide connecting the two positions to each other is defined as $\Delta L(m)$, $m=(2n-1)$, where n is an integer, is satisfied, and a wavelength of a sound deadening symmetrical sound is defined as $\lambda(m)$,
$\Delta L = m \cdot \lambda/2$ is satisfied.

12. The method according to claim 11, further comprising reversing the paper sheet passing through the transporting guide using the sound propagation guide as a reverse transporting guide, and transporting the paper sheet to the transporting guide again.

13. The method according to claim 11, further comprising providing the sound propagation guide connecting the two positions to each other such that the length of the sound propagation guide is shorter than the length between the two positions of the transporting guide.

14. The method according to claim 12, further comprising propagating a first sound from the reverse transporting guide via the transporting guide, and propagating a second sound from the transporting guide via the reverse transporting guide.

15. The method according to claim 12, further comprising setting the transporting guide to a predetermined length.

* * * * *